(12) United States Patent
Randall

(10) Patent No.: US 9,063,019 B2
(45) Date of Patent: Jun. 23, 2015

(54) DEVICE FOR POSITIONING A TEMPERATURE SENSOR

(71) Applicant: James E. Randall, Huron, OH (US)

(72) Inventor: James E. Randall, Huron, OH (US)

(73) Assignee: Erie Instruments, LLC, Huron, OH (US)

( * ) Notice: Subject to any disclaimer, the term of this patent is extended or adjusted under 35 U.S.C. 154(b) by 302 days.

(21) Appl. No.: 13/687,359

(22) Filed: Nov. 28, 2012

(65) Prior Publication Data

US 2014/0146849 A1    May 29, 2014

(51) Int. Cl.
*G01K 1/14*     (2006.01)

(52) U.S. Cl.
CPC .............. *G01K 1/14* (2013.01); *G01K 2207/06* (2013.01)

(58) Field of Classification Search
USPC .................................................. 374/141, 208
See application file for complete search history.

(56) References Cited

U.S. PATENT DOCUMENTS

| | | | |
|---|---|---|---|
| 3,075,454 A * | 1/1963 | Henyan ....................... 99/421 R |
| 5,992,302 A | 11/1999 | Geisler | |
| 6,293,188 B1 | 9/2001 | Gabriel | |
| 6,813,575 B2 | 11/2004 | Laflamme | |
| 6,854,883 B2 | 2/2005 | Rund et al. | |
| 6,866,417 B2 | 3/2005 | Gunawardena et al. | |
| 7,338,204 B2 * | 3/2008 | Hill et al. ...................... 374/121 |
| 8,870,453 B2 * | 10/2014 | Branch ......................... 374/170 |
| 2004/0165647 A1 * | 8/2004 | Singh et al. .................... 374/208 |
| 2005/0261991 A1 | 11/2005 | Kennamer | |
| 2009/0034583 A1 | 2/2009 | Chab et al. | |
| 2009/0324785 A1 | 12/2009 | Ceravalls Pujol et al. | |
| 2010/0128753 A1 | 5/2010 | Claypool et al. | |

* cited by examiner

*Primary Examiner* — Mirellys Jagan
(74) *Attorney, Agent, or Firm* — Ulmer & Berne LLP

(57) ABSTRACT

A device for positioning a temperature sensor includes a support structure and a lower platen supported by the support structure. The lower platen includes an upper surface, and at least a portion of the upper surface is located in a horizontal plane. The device further includes a sensor guide structure that includes an aperture having a centerline axis. The aperture is oriented horizontally and is configured to receive a temperature sensor. The sensor guide structure is vertically movable relative to the upper surface of the lower platen in proportion to a thickness of a food product supported on the upper surface of the lower platen, as measured in a direction perpendicular to the horizontal plane.

23 Claims, 6 Drawing Sheets

DEVICE FOR POSITIONING A TEMPERATURE SENSOR

TECHNICAL FIELD

The present application relates to a device for positioning a temperature sensor.

BACKGROUND

Some known food products, including food patties such as chicken and hamburger patties, are cooked initially in a food processing plant, then frozen, and subsequently shipped to a retail outlet, e.g., a grocery store or supermarket, for sale to a consumer. After initial cooking within the food processing plant, samples of the cooked food product are removed from a production conveyor, and the temperature of the cooked food product samples are measured to ensure that a minimum temperature of the food product is equal to or exceeds a minimum temperature, to kill bacteria. Known methods of measuring the temperature of a cooked food product include placing the food product on a support surface and manually inserting a temperature sensor into the food product, in an uncontrolled manner.

SUMMARY

According to one embodiment, a device for positioning a temperature sensor includes a support structure and a lower platen. The lower platen includes an upper surface and is supported by the support structure. At least a portion of the upper surface is located in a first horizontal plane. The device also includes a sensor guide structure that defines an aperture configured to receive a temperature sensor. The aperture has a centerline axis that is parallel with the first horizontal plane. The device further includes means for moving the sensor guide structure vertically relative to the upper surface of the lower platen in proportion to a thickness of a food product supported on the upper surface of the lower platen.

According to another embodiment, a device for positioning a temperature sensor includes a support structure and a lower platen. The lower platen includes an upper surface and is supported by the support structure. At least a portion of the upper surface is located in a first horizontal plane. The device also includes a sensor guide structure that defines an aperture configured to receive a temperature sensor. The device further includes an upright member that includes a lower end and an upper end. The lower end is pivotally coupled with the support structure. The device also includes a lever pivotally coupled with the upper end of the upright member, and a guide support structure attached to the sensor guide structure and coupled with the lever. The sensor guide structure is vertically movable relative to the upper surface of the lower platen, as the lever pivots relative to the upright member, in proportion to a thickness of a food product supported on the upper surface of the lower platen.

A method of measuring a temperature of a food product uses a device that includes a support structure, a lower platen supported by the support structure, and a sensor guide structure that defines an aperture having a centerline axis. The method includes placing a food product on an upper surface of the lower platen. The food product has a thickness measured in a first direction perpendicular to the upper surface of the lower platen. The method also includes positioning the sensor guide structure vertically such that the centerline axis of the aperture defined by the sensor guide structure is spaced above the upper surface of the lower platen by a first distance. The first distance is established in proportion to the thickness of the food product. The method further includes inserting a temperature sensor through the aperture defined by the sensor guide structure and into the food product, in a second direction parallel to the upper surface of the lower platen.

BRIEF DESCRIPTION OF THE DRAWINGS

Various embodiments will become better understood with regard to the following description, appended claims and accompanying drawings wherein:

DETAILED DESCRIPTION

Figure 1:
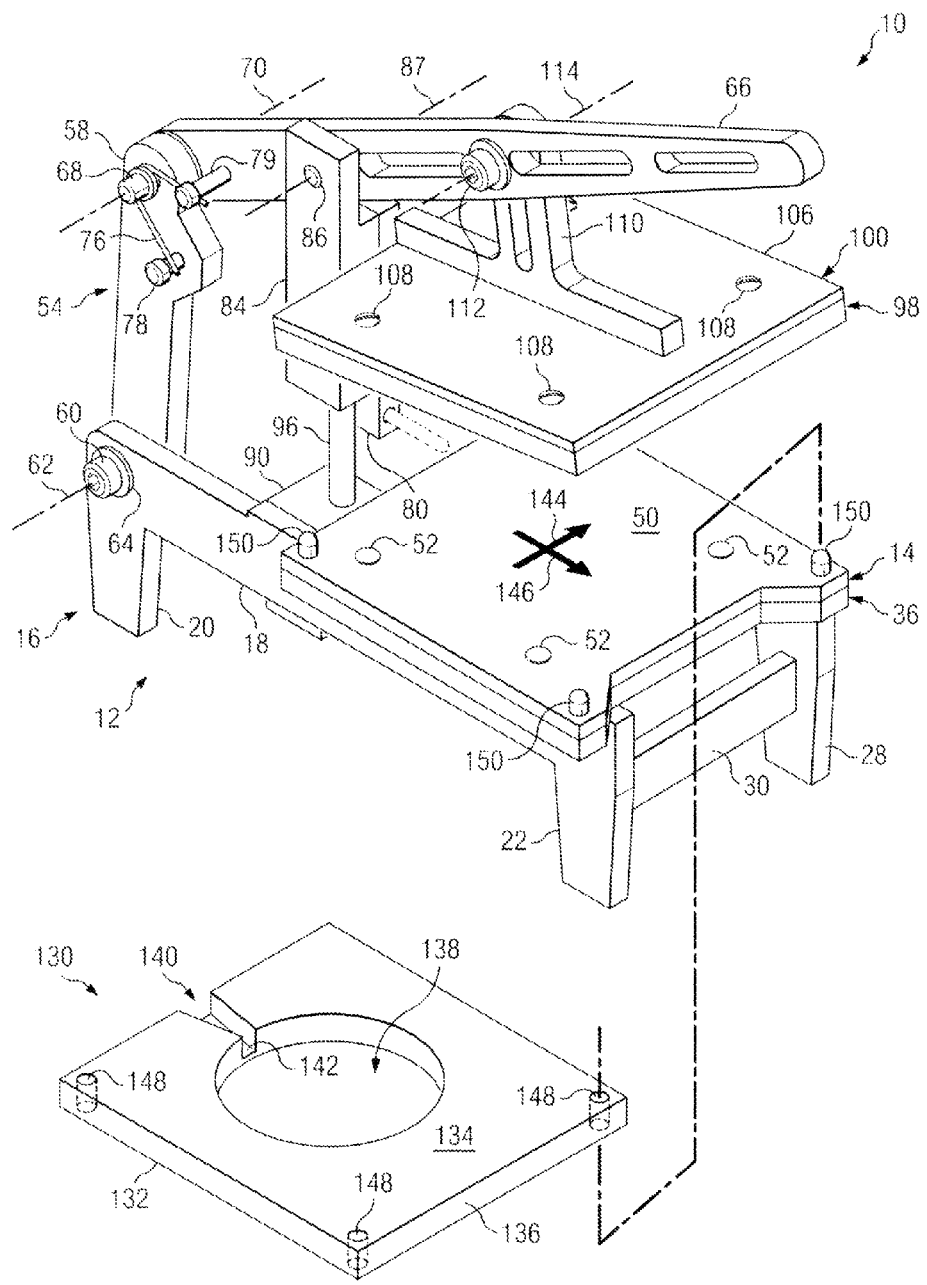
FIG. 1 is a top, rear perspective view depicting a device for positioning a temperature sensor according to one embodiment, with a food product receptacle spaced from the remainder of the device.

Referring to the drawings, wherein like numbers indicate the same or corresponding elements throughout the views, FIG. 1 illustrates a device 10 for positioning a temperature sensor. The device 10 can be used to position a temperature sensor of the type that is used to measure the temperature of a cooked food product, such as a chicken or hamburger patty, at an off-line food testing station within a food processing plant. In such a plant, samples of cooked food products can be periodically removed from a production conveyer within the plant, and the temperature of the food product samples can be measured to ensure that the food product is being cooked as desired, e.g., that the minimum temperature of the food product is equal to or exceeds a desired value to kill bacteria within the food product.

The device 10 can include a support structure 12 and a lower platen 14, which can be supported by the support structure 12. The lower platen 14 can be formed, or otherwise manufactured, from any suitable food-contact-compatible material as determined by the U.S. Food and Drug Administration (FDA). Such food-contact-compatible materials can include, but are not limited to, various polymeric materials, e.g., ultra-high-molecular-weight polyethylene (UHMW), polytetrafluoroethylene (PTFE), and others, and various metals, e.g., series 300 stainless steel. The support structure 12 can be manufactured from any suitable incidental-food-contact material, as determined by the FDA. Such materials can include, but are not limited to, various metals. In other embodiments, the support structure 12 can be manufactured from any suitable food-contact-compatible material, as determined by the FDA.

Figure 2:
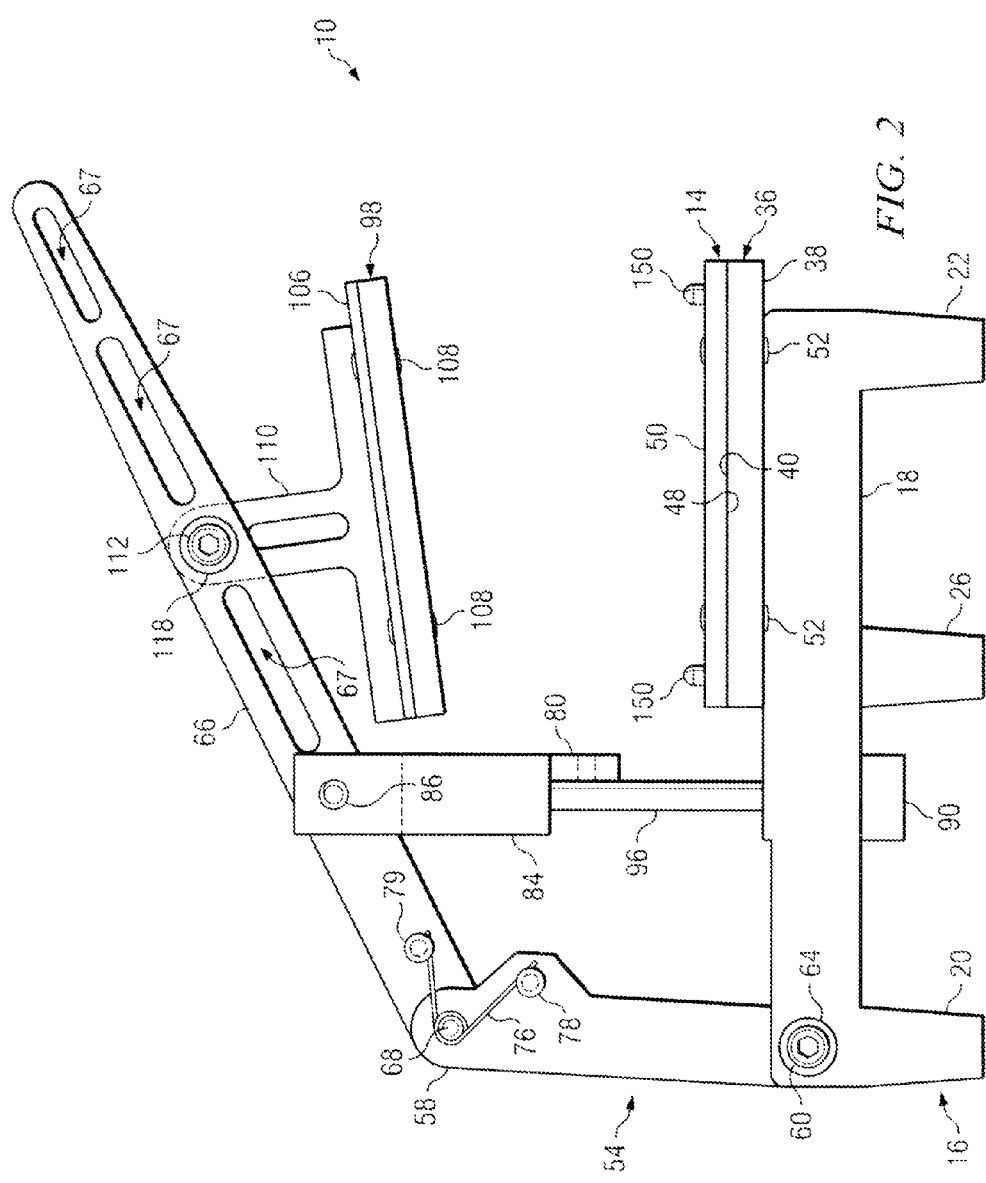
FIG. 2 is a rear elevational view of the device of FIG. 1, with the food product receptacle removed for clarity of illustration, and with a lever of the device shown in a raised position.
Figure 3:
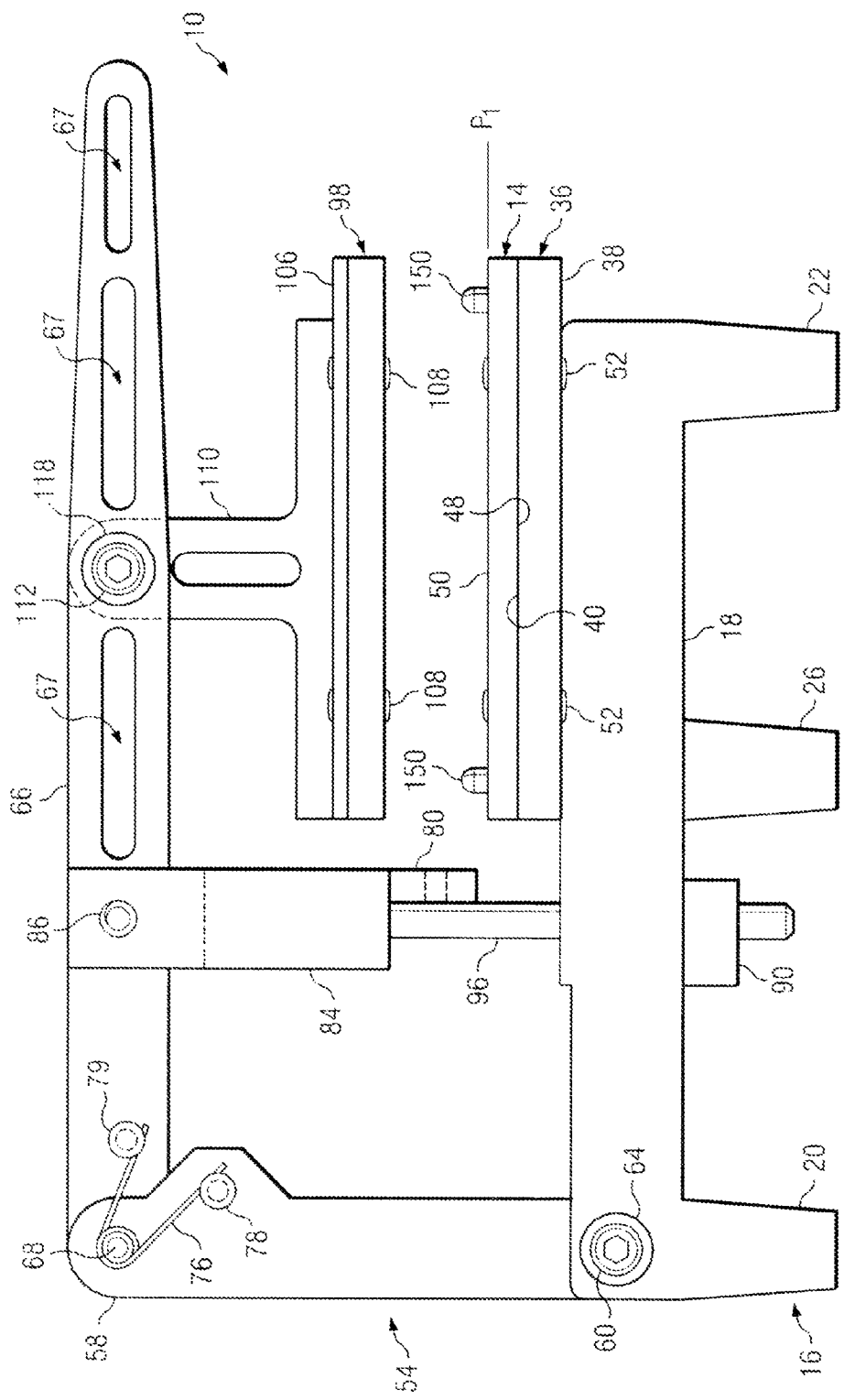
FIG. 3 is a rear elevational view similar to FIG. 2, but with the lever of the device being shown in a lowered, horizontal position.

The support structure 12 can include a frame 16, according to one embodiment. The frame 16 can include a rear member 18 and one or more legs, or supports, that can extend downwardly from the rear member 18, and are suitable for contact with a support surface. In one embodiment, the frame 16 can include a leg 20, which can be a left, rear leg, which can extend downwardly from one end of the rear member 18. Frame 16 can also include a leg 22, which can be a right, rear leg, which can extend downwardly from an opposite end of the rear member 18, as shown in FIGS. 1-3. Each of the legs 20 and 22 and the rear member 18 can be manufactured as a unitary structure. Alternatively, the legs 20, 22 can be made separately from the rear member 18 and attached, in any suitable manner, to the rear member 18.

Figure 4:
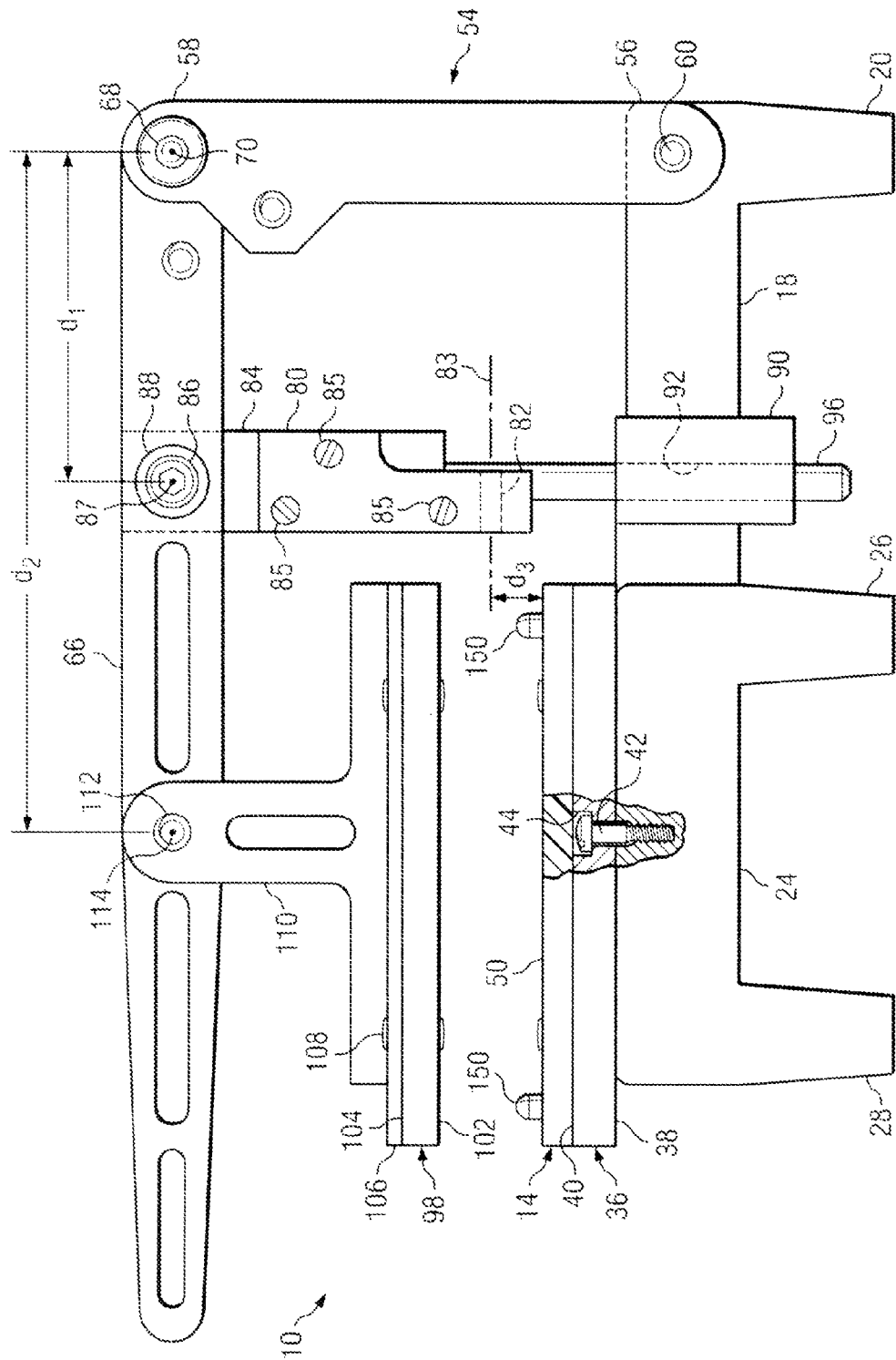
FIG. 4 is a front elevational view of the device of FIG. 1, with the food product receptacle removed for clarity of illustration, and with the lever of the device shown in a lowered, horizontal position.

Referring to FIG. 4, the frame 16 can include a front member 24, and one or more legs that can extend downwardly from the front member 24. In one embodiment, the frame 16 can include a leg 26, which can be a left, front leg, which can extend downwardly from one end of the front member 24. Frame 16 can also include a leg 28, which can be a right, front leg, which can extend downwardly from an opposite end of the front member 24. Each of the legs 26 and 28 and the front member 24 can be manufactured as a unitary structure. Alternatively, the legs 26, 28 can be made separately from the front member 24 and attached, in any suitable manner, to the front member 24. The frame 16 can also include one or more transverse members, or cross members, such as transverse member 30 shown in FIG. 1. The transverse member 30 can extend between the leg 22 and leg 28 as shown in FIG. 1. The transverse member 30 can be attached to each of the legs 22, 28 in any suitable manner, for example, using fasteners (not shown). In other embodiments, frames can include more or less members than those shown, and can be arranged in configurations other than that shown. One or more of the rear member 18, the front member 24, and legs 20, 22, 26 and 28 can have shapes and sizes (including thicknesses) other than those shown. Additionally, while the rear member 18, the front member 24 and legs 20, 22, 26 and 28 can be solid in one embodiment, in other embodiments, one or more of these members can have a hollow construction. In another embodiment, an entire frame can be manufactured as a unitary structure, for example, as a molded, cast, machined, or fabricated, unitary structure, and can have any suitable configuration.

In one embodiment, the support structure 12 can also include a lower support plate 36, which can be attached to the frame 16. The lower support plate 36 can include a lower surface 38 which can contact the frame 16, and an upper surface 40. In one embodiment, the lower support plate 36 can be attached to the frame 16 with a plurality of fasteners, for example, a plurality of round-head screws 42 (one shown in FIG. 4). A like number of counterbores 44 (one shown in FIG. 4) can be formed in the lower support plate 36, and the head of each of the round-head screws 42 can be positioned within a respective counterbore 44 such that the heads of the round-head screws 42 can be positioned below, or flush with, the upper surface 40 of the lower support plate 36. In one embodiment, six of the round-head screws 42 can be used to attach the lower support plate 36 to the frame 16. In other embodiments, more or less of the round-head screws 42 can be used. In some embodiments, one or more different types of fasteners can be used in lieu of, or in combination with, the round-head screws 42 to attach the lower support plate 36 to the frame 16. The lower support plate 36 can provide additional support for the lower platen 14, i.e., in addition to the support provided by frame 16, for example to entirely prevent, or substantially entirely prevent, warpage of the lower platen 14 due to contact with hot food products placed on the lower platen 14. In an alternate embodiment, a support structure can include a frame and a lower support plate that can be manufactured as a unitary structure, for example, as a molded, cast, machined, or fabricated, unitary structure, and can have any suitable configuration. In another alternate embodiment, when the lower platen 14 is sufficiently thick to prevent warpage, the lower support plate 36 can be omitted, and the lower platen 14 can be attached directly to the frame 16 of the support structure 12. In yet another alternate embodiment, the lower platen 14 and the frame 16 of the support structure 12 can be manufactured as a unitary structure, using any suitable process, e.g., molding or casting, from any suitable food-contact-compatible material. In another alternate embodiment, a support structure and a lower platen can be manufactured as a unitary structure having a different configuration, from any suitable food-contact-compatible material, using any suitable process, e.g., molding, casting, machining or any suitable fabrication process, which can include cutting and bending, for example.

The lower platen 14 can include a lower surface 48 and an upper surface 50. At least a portion of the upper surface 50 can be located in a first horizontal plane $P_1$ (FIG. 3). In one embodiment, the entire upper surface 50 can be located in the first horizontal plane $P_1$. The lower surface 48 can be in contacting engagement with the upper surface 40 of the lower support plate 36, as shown in FIGS. 1-4. In other embodiments, when the lower support plate 36 is omitted, the lower surface 48 of the lower platen 14 can be in contacting engagement with the frame 16 of the support structure 12. The lower platen 14 can be attached to the lower support plate 36. In one embodiment, the lower platen 14 can be fastened to the lower support plate 36, for example using a plurality of screwposts 52, as shown in FIGS. 1-4. In one embodiment, four of the screwposts 52 can be used to attach the lower platen 14 to the lower support plate 36. In other embodiments, more or less screwposts 52 can be used, or alternatively, other types of fasteners can be used in lieu of, or in combination with the screwposts 52, to attach the lower platen 14 to the lower support plate 36. The material of construction of the lower platen 14 can have relatively low thermal conductivity. As a result, the temperature reduction in a food product placed on the lower platen 14 can be at or below an acceptable level, during the time required to position the food product on the lower platen 14 and measure an internal temperature of the food product at a desired location.

The device 10 can include an upright member 54, which can be pivotally coupled with the frame 16 of the support structure 12. As shown in FIG. 4, the upright member 54 can include a lower end 56 and an upper end 58. The lower end 56 of the upright member 54 can be coupled with the frame 16. A pivot 60, which can have a pivot axis 62 (FIG. 1) can pivotally couple the lower end 56 of the upright member 54 with the frame 16. In one embodiment, the pivot 60 can be a shoulder bolt, but in another embodiment, different types of pivots can be used in lieu of a shoulder bolt. In one embodiment, the pivot 60 can extend through one of the frame 16 and the upright member 54 and can be threaded into the other one of the frame 16 and the upright member 54. In one embodiment, as shown in FIGS. 3 and 4, the pivot 60 can extend through the frame 16 and can be threaded into the upright member 54. One or more fasteners can be used in conjunction with the pivot 60. For example, a flat washer 64 can be positioned adjacent the frame 16 and, in one embodiment, a wave washer (not shown) can be positioned between a head of the pivot 62 and the flat washer 64. An additional flat washer (not shown) can be positioned between the frame 16 and the upright member 54. It will be appreciated that the upright member 54 can be coupled with the frame 16 using pivots and fasteners other than those shown, and in any suitable arrangement. The upright member 54 can pivot about the pivot axis 62, e.g., through relatively small angles, which can be advantageous as subsequently described.

Figure 5:
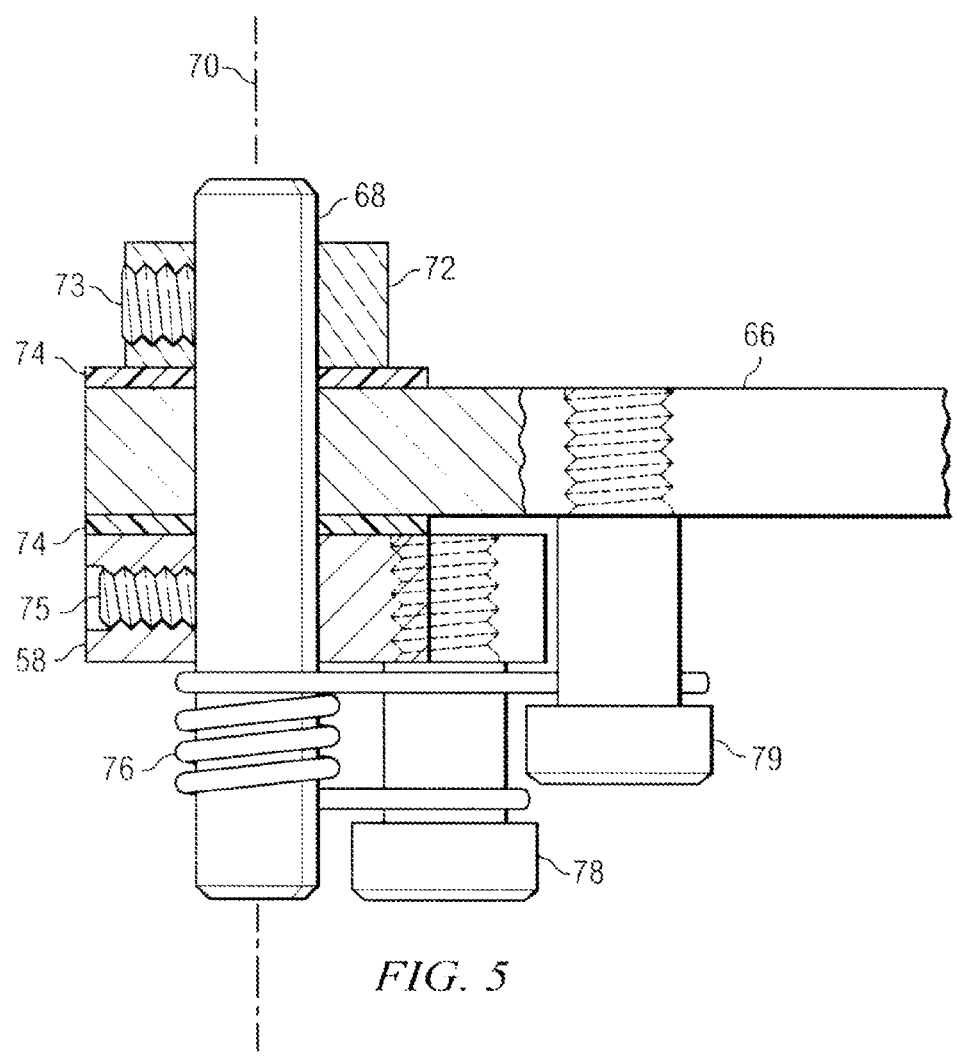
FIG. 5 is an enlarged fragmentary view, partially in cross-section, depicting a portion of the lever of the device of FIG. 1, in association with a portion of an upright member of the device, a pivot and a biasing member, as well as attachment members.

The device 10 can also include a lever 66, which can be pivotally coupled with the upright member 54. In one embodiment, the lever 66 can be pivotally coupled with the upper end 58 of the upright member 54, as shown in FIGS. 1-5. The device 10 can include a pivot 68, which can pivotally couple the lever 66 with the upright member 54. The pivot 68 can have a pivot axis 70 (FIGS. 1 and 5). As shown in FIG. 5, the pivot 68 can extend through each of the upper end 58 of the upright member 54 and the lever 66. In one embodiment, the pivot 68 can also extend through an annular collar 72 and can be secured to the annular collar 72, for example using a set screw 73, as shown in FIG. 5. A washer 74, which can be a flat washer, can be positioned between the annular collar 72 and the lever 66. The pivot 68 can be secured to the upper end 58 of the upright member 54, for example, using a set screw 75. Another washer 74 can be positioned between the upper end 58 of the upright member 54 and the lever 66. It will be appreciated that the pivot 70 can be secured to each of the upper end 58 of the upright member 54 and the lever 66 using different types and/or numbers of fasteners than those shown, and which can be arranged in configurations other than that shown. Furthermore, it will be appreciated that pivots can be provided having configurations other than the configuration of pivot 68. The lever 66 can pivot about the pivot axis 70 between a raised position shown in FIGS. 1 and 2 and various lowered positions, such as a lowered, horizontal position shown in FIGS. 3 and 4.

The device 10 can include a biasing member 76 (FIGS. 1-3 and 5), which can bias the lever 66 toward the raised position shown in FIGS. 1 and 2. In one embodiment, the biasing member 76 can be a spring. The biasing member 76 can be configured such that one or more coils can extend around the pivot 68, for example, as shown in FIG. 5, with opposite ends of the biasing member 76 extending away from the pivot 68, as also shown in FIG. 5. The biasing member 76 can be used in conjunction with fasteners 78 and 79, which can be shoulder bolts in one embodiment. The fastener 78 can be threaded into the upper end 58 of the upright member 54, and the fastener 79 can be threaded into the lever 66. One end of the biasing member 76 can engage a shank of the fastener 78 and an opposite end of the biasing member 76 can engage a shank of the fastener 79. It will be appreciated that biasing members can be provided that are configured and arranged other than that shown. In one embodiment, a counterweight (not shown) can be cantilevered from the end of the lever 66 that is coupled with the upper end 58 of the upright member 54. Such a counterweight can be used in lieu of, or in conjunction with, biasing member 76 or other types of biasing members to bias the lever 66 toward the raised position shown in FIGS. 1 and 2.

Figure 6:
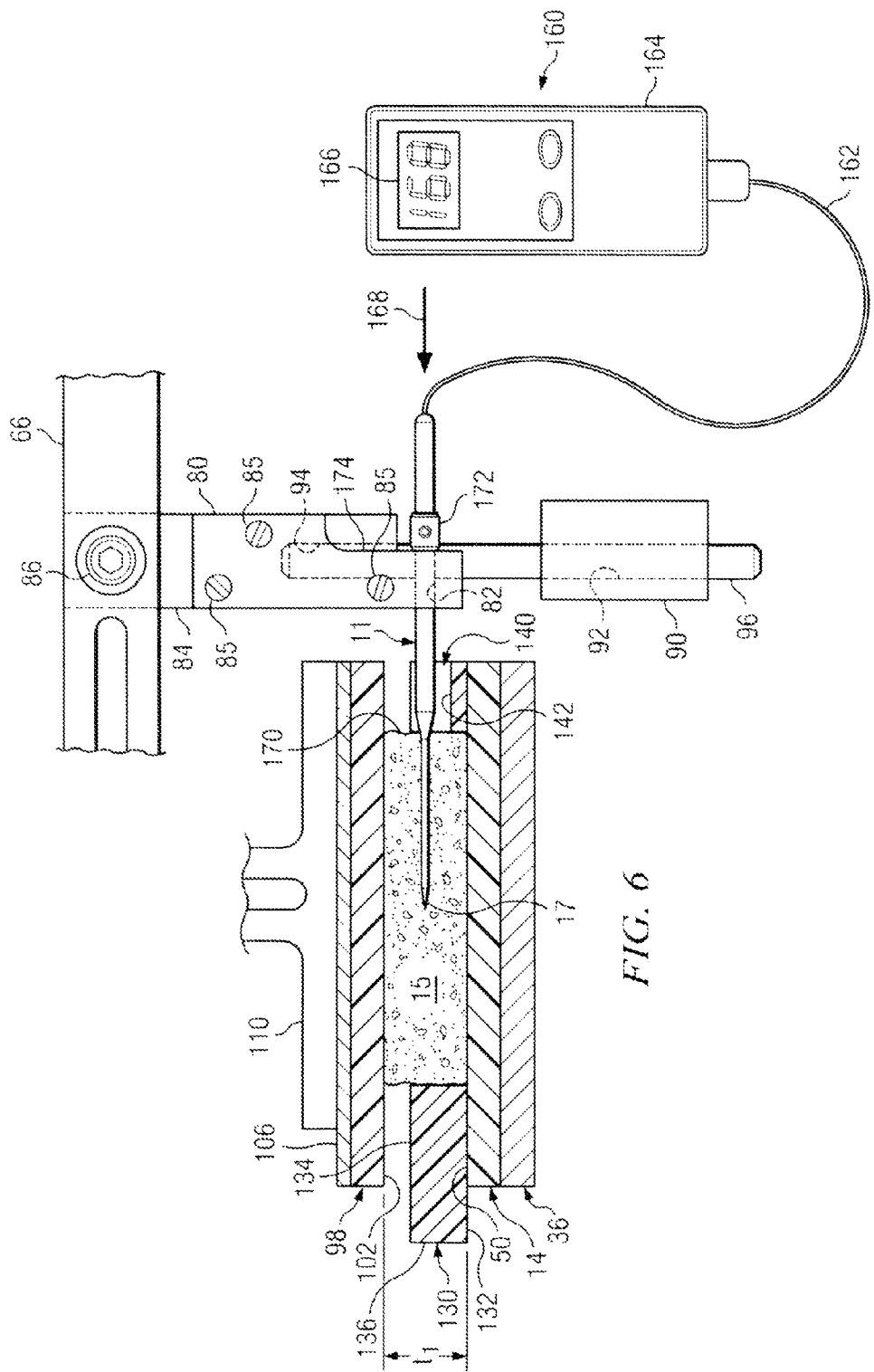
FIG. 6 is an enlarged, fragmentary, front elevational view, partially in cross-section, depicting a portion of the device of FIG. 1, in association with a temperature sensor and an associated electronic readout, and depicting the temperature sensor inserted into a food product positioned within the food product receptacle.

The device 10 can include a sensor guide structure 80, which can be movable vertically relative to the upper surface 50 of the lower platen 14, in proportion to a thickness of a food product supported on the upper surface 50 of the lower platen 14, for example in proportion to a thickness $t_1$ of a food product 15 shown in FIG. 6, with the thickness $t_1$ of the food product 15 being measured in a direction perpendicular to the first horizontal plane $P_1$. The sensor guide structure 80 can be vertically movable relative to the support structure 12 and the lower platen 14, as the lever 66 pivots about the pivot axis 70. The sensor guide structure 80 can define an aperture 82, which can have a centerline axis 83, as shown in FIG. 4. The aperture 82 can be oriented horizontally, such that the centerline axis 83 can be parallel with the first horizontal plane $P_1$. The aperture 82 can be configured to receive a temperature sensor, for example a temperature sensor 11 shown in FIG. 6.

The device 10 can also include a guide support structure 84, which can be attached to the sensor guide structure 80, for example using a plurality of male fasteners 85, such that the guide support structure 84 can be vertically movable with the sensor guide structure 80. In an alternate embodiment, the guide support structure 84 and the sensor guide structure 80 can be manufactured as a unitary structure. The guide support structure 84 can be coupled with the lever 66 using a coupling member 86 having a longitudinal centerline axis 87 (FIG. 1). The coupling member 86 can be associated with other fasteners. For example, a flat washer 88 (FIG. 4) can be positioned adjacent to the lever 66 and, in one embodiment, a wave washer (not shown) can be positioned between a head of the coupling member 86 and the flat washer 88. Another flat washer (not shown) can be positioned between the lever 66 and the guide support structure 84. The coupling member 86 can be threaded into the guide support structure 84. It will be appreciated that coupling members can be used that have configurations other than that shown for the coupling member 86, and can be used in conjunction with other numbers and/or configurations of fasteners than those shown. The longitudinal centerline axis 87 of the coupling member 86 can be spaced from the pivot axis 70 of pivot 68 by a first distance $d_1$, as shown in FIG. 4.

The support structure 12 of the device 10 can include a piston-receiving member 90 (FIG. 4), which can be attached to the frame 16 of the support structure 12, for example using fasteners (not shown). In an alternate embodiment, the piston-receiving structure 90 can be manufactured with the frame 16 as a unitary structure. In other alternate embodiments, the piston-receiving structure 90 can be manufactured with the frame 16 and lower support plate 36, or with the frame 16 only, as a unitary structure, from any suitable material, e.g., any suitable incidental-food-contact material. In yet another embodiment, the piston-receiving structure 90 can be manufactured with the frame 16 and the lower platen 14, as a unitary structure, from any suitable food-contact-compatible material. The piston-receiving structure 90 can define a lower bore 92 as shown in FIG. 4. The guide support structure 84 can define an upper bore 94, as shown in FIG. 6. The device 10 can also include a piston 96. The piston 96 can be secured to one of the piston-receiving structure 90 and the guide support structure 84, and can be vertically movable relative to the other one of the piston-receiving structure 90 and the guide support structure 84. An upper portion of the piston 96 can be positioned within the upper bore 94 defined by the guide support structure 84, and a lower portion of the piston 96 can be positioned within the lower bore 92 defined by the piston-receiving structure 90. In one embodiment, the piston 96 can be secured to the guide support structure 84, for example, using a set screw (not shown) or a suitable adhesive, and can be vertically movable relative to the piston-receiving structure 90, within the lower bore 92 defined by the piston-receiving structure 90. In an alternate embodiment, the piston 96 can be secured to the piston-receiving structure 90, for example, using a set screw (not shown) or a suitable adhesive, and can be vertically movable relative to the guide support structure 84 within the upper bore 94 defined by the guide support structure 84. The arrangement of the piston 96 within each of the lower bore 92 and the upper bore 94, can constrain the piston guide structure 80 to move vertically relative to the support structure 12 and the lower platen 14, as the lever 66 pivots about the pivot axis 70. The ability of the upright member 54 to pivot about pivot axis 62, can facilitate the vertical movement of the sensor guide structure 80, since the pivotal movement of the upright member 58 can prevent binding of the piston 96 within one or both of the lower bore 92 and the upper bore 94, as the lever 66 pivots about the pivot axis 70.

The device 10 can also include an upper platen 98 and an upper platen support structure 100, which can be attached to the upper platen 98 and can be coupled with the lever 66, as shown in FIG. 1. Referring to FIG. 4, the upper platen 98 can include a lower surface 102 and an upper surface 104. The lower surface 102 of the upper platen 98 can face the upper surface 50 of the lower platen 14, at least when the lever 66 is in a lowered, horizontal position as shown in FIGS. 3-4. The upper platen 98 can be manufactured from any suitable food-contact-compatible material as determined by the FDA, such as those described previously regarding the lower platen 14. In one embodiment, the upper platen 98 and the lower platen 14 can be formed from the same material. The upper platen support structure 100 can include an upper support plate 106, which can be attached to the upper platen 98, and can be in contacting engagement with the upper surface 104 of the upper platen 98. In one embodiment, the upper support plate 106 can be fastened to the upper platen 98, for example using a plurality of fasteners 108, which can be a plurality of screwposts in one embodiment. In other embodiments, different numbers and/or types of fasteners than those shown can be used to attach the upper support plate 106 to the upper platen 98. The upper platen support structure 100 can also include a transverse member 110, which can be secured to the upper support plate 106 in any suitable manner, and can extend away from the upper support plate 106 as shown in FIG. 1.

The device 10 can include a coupling member 112, having a longitudinal centerline axis 114 (FIG. 1), which can couple the upper platen support structure 100 with the lever 66 such that the upper platen support structure 100 and the upper platen 98 can pivot about the longitudinal centerline axis 114 of the coupling member 112. As shown in FIGS. 1-4, in one embodiment, the coupling member 112 can be a shoulder bolt and can extend through the lever 66, and can be threaded into the transverse member 110 of the upper platen support structure 100. The coupling member 112 can be associated with one or more additional fasteners. For example, as shown in FIGS. 2-3, a flat washer 118 can be positioned adjacent to the lever 66, and, in one embodiment, a wave washer (not shown) can be positioned between a head of the coupling member 112 and the flat washer 118. Another washer (not shown), which can be a flat washer, can be positioned between the lever 66 and the upper platen support structure 100. It will be appreciated that other arrangements can be used to couple the upper platen support structure 100 with the lever 66. For example, the coupling member 112 can be used in association with different types and/or numbers of fasteners, which can be arranged in configurations other than that shown. Furthermore, it will be appreciated that coupling members can be provided having configurations other than the configuration of coupling member 112. As shown in FIG. 4, the longitudinal centerline axis 114 of coupling member 112 can be spaced from the pivot axis 70 by a distance $d_2$.

Device 10 can also include a food product receptacle. FIGS. 1 and 6 illustrate a food product receptacle 130, according to one embodiment. The food product receptacle 130 can be placed on the lower platen 14, and can be configured to facilitate maintaining a food product in a desired position to facilitate measuring an internal temperature of the food product. The food product receptacle 130 can include a lower surface 132, an upper surface 134, and an edge surface 136 that can extend between the lower surface 132 and the upper surface 134. The food product receptacle 130 can define an interior aperture 138. The interior aperture 138 can extend entirely through the food product receptacle 130 from the upper surface 134 to the lower surface 132. The food product receptacle 130 can also define a passage 140, which can communicate with the interior aperture 138, and can extend through the edge surface 136. In one embodiment, the passage 140 can extend partially through a thickness of the food product receptacle 130 to a surface 142 which can spaced from the lower surface 132 of the food product receptacle 130. In other embodiments, the passage 140 can extend entirely through the thickness of the food product receptacle 130. The dimensional stability of the food product receptacle 130 can be enhanced when the passage 140 does not extend entirely through the food product receptacle 130, as shown in FIG. 1.

The passage 140 can be sized and configured to receive a portion of a temperature sensor, e.g., the temperature sensor 11 shown in FIG. 6. The passage 140 can have any suitable configuration. For example, the passage 140 can be configured as a slot, or channel, as shown in FIG. 1, and can be flared or tapered from one end to the other. In one embodiment, the passage 140 can flare outwardly from the interior aperture 138 toward the edge surface 136, as shown in FIG. 1. In another embodiment, the passage 140 can be straight, or substantially straight. In yet another embodiment, the passage 140 can be configured as a clearance hole, which can have a round shape or any other suitable shape. In still other embodiments, the food product receptacle 130 can be generally C-shaped, such that the interior aperture 138 extends through a portion of the edge surface 136. In some embodiments, the food product receptacle 130 can include one or more ramps (not shown), which can be positioned within passage 140 or adjacent to passage 140 to facilitate positioning a portion of a temperature sensor, e.g., temperature sensor 11, within the passage 140 as desired. For example, one or more ramps can be used to position a temperature sensor, e.g., temperature sensor 11, vertically within the passage 140 and/or one or more ramps can be used to position the temperature sensor laterally within the passage 140, i.e., between opposing surfaces that can cooperate with surface 142 to define the passage 140.

In some applications, depending upon the consistency of the food product being positioned on the lower platen 14 for temperature measurement, the food product receptacle 130 may not be used. For example, the consistency of a hamburger patty may be such that the hamburger patty is not displaced when an end of a temperature sensor, e.g. temperature sensor 11, is inserted into the hamburger patty. With other food products that are "tougher" or have a denser consistency (e.g., some whole meat products), use of the product receptacle 130 can facilitate effective maintenance of the food product in a desired location during insertion of an end of the temperature sensor 11 into the food product. Furthermore, an operator may choose to utilize the food product receptacle 130, even when measuring the internal temperature of a food product such as a hamburger patty, since use of the food product receptacle 130 can enhance the accuracy and/or consistency of positioning the food product on the lower platen 14 as desired.

The lower platen 14 and the food product receptacle 130 can include mating locating features that can facilitate positioning the food product receptacle 130 on the upper surface 50 of the lower platen 14, such that the lower surface 132 of the food product receptacle 130 is positioned within the first horizontal plane P₁. For example, mating locating features can facilitate positioning the food product receptacle 130 in a back-to-front direction relative to the lower platen 14, as indicated generally by arrow 144 in FIG. 1, and can facilitate positioning the food product receptacle 130 relative to the lower platen 14 in a left-to-right direction, as indicated generally by arrow 146 in FIG. 1. In one embodiment, the food product receptacle 130 can define a plurality of locating apertures 148, which can extend through the food product receptacle 130 from the top surface 134 to the lower surface 132. A plurality of locating pins 150 can be integral with the lower platen 14, i.e., integrally formed with the lower platen 14 as a unitary structure, or formed separately from the lower platen 14 but in contact with the lower platen 14 and attached or secured to the lower platen 14 in any suitable manner, for example by press fitting each of the locating pins 150 within a respective aperture (not shown) defined by the lower platen 14. In one embodiment, the locating pins 150 can also be attached or secured to the lower support plate 36.

In one embodiment, the food product receptacle 130 can define three of the locating apertures 148 and three of the locating pins 150 can be integral with the lower platen 14. However, in other embodiments, different numbers of locating apertures and locating pins can be used. When the food product receptacle 130 is positioned on the lower platen 14, each of the locating apertures 148 can receive a respective one of the locating pins 150. The lower surface 132 of the food product receptacle 130 can define one or more recesses (not shown), which can receive respective ones of the fasteners 52, such that a remainder of the lower surface 132 of the food product receptacle 130 can contact, and can be flush with, the upper surface 50 of the lower platen 14. In other embodiments, locating pins can be secured to the food product receptacle 130 and can extend below the lower surface 132, and the lower platen 14 can define a plurality of locating apertures, with each of the locating apertures receiving one of the locating pins extending downwardly from the lower surface 132 of the food product receptacle 130. It will be appreciated that other types and configurations of mating locating features can be used to position the food product receptacle 130 relative to the lower platen 14 as desired.

When the food product receptacle 130 is positioned as desired on the upper surface 50 of the lower platen 14, when the lower surface 132 of the food product receptacle 130 is located as desired within the first horizontal plane P₁, the centerline axis 83 of the aperture 82 defined by the sensor guide structure 80 can be located in a vertical plane (not shown), which can pass through the passage 140 and a center of the interior aperture 138. In one embodiment, the food product receptacle 130 can be configured such that the center of the interior aperture 138 can be positioned midway between a back side portion and a front side portion of the edge surface 136 of the food product receptacle 130, and/or midway between a left side portion and a right side portion of the edge surface 136 of the food product receptacle 130. The interior aperture 138 of the food product receptacle 130 can be sized and shaped to receive a particular food product. In one embodiment, the interior aperture 138 can have a round shape, as shown in FIG. 1. However, the interior aperture 138 can have any other suitable shape and size. It will be appreciated that an operator of a food processing plant may have an inventory that includes multiple food product receptacles having interior apertures of various shapes and sizes, to correspond with different food products that are routinely processed by the plant.

The attachment of the sensor guide structure 80 to the guide support structure 84 can be adjusted as required, with the male fasteners 85, such that the aperture 82 defined by the sensor guide structure 80 and the centerline axis 83 of the aperture 82 are oriented horizontally. The adjustment of the orientation of the aperture 82 can be accomplished in conjunction with a calibration of the device 10, in which the sensor guide structure 80 can be positioned vertically relative to the guide support structure 84, during attachment of the sensor guide structure 80 to the guide support structure 84, such that the centerline axis 83 of the aperture 82 can be positioned parallel with the first horizontal plane P₁, and vertically between the upper surface 50 of the lower platen 14 and the lower surface 102 of the upper platen 98, as desired. This can result in orienting the temperature sensor 11 horizontally, and positioning the temperature sensor 11 vertically as desired, when the temperature sensor 11 extends through the aperture 82.

The desired positioning of the centerline axis 83 of the aperture 82 defined by the sensor guide structure 80 can depend upon factors that can include the type of cooking process used to cook the food product, the geometry of the particular food product, and whether the food product is homogeneous. In one embodiment, it can be desirable to measure the temperature of a food product at a geometric center of the food product after completion of the cooking process, for example, if the coolest internal temperature of the food product is expected to exist at the geometric center of the food product. In this embodiment, it can be desirable to position the sensor guide structure 80 relative to the guide support structure 84 such that the centerline axis 83 is midway between the upper surface 50 of the lower platen 14 and the lower surface 102 of the upper platen 98, as shown in FIGS. 3 and 4. A calibration block (not shown), or other member, can be positioned between, and in contacting engagement with, the upper surface 50 of the lower platen 14 and the lower surface 102 of the upper platen 98. The sensor guide structure 80 can be positioned vertically relative to the sensor guide structure 84 such that the centerline axis 83 coincides with a vertical center of the calibration block, after which the male fasteners 85 can be used to attach the sensor guide structure 80 to the guide support structure 84. The vertical height of the calibration block can be selected such that it is in the middle of, or about in the middle of, a range of thicknesses of food products. For example, in one embodiment, the device 10 can be used to measure internal temperatures of food products having thicknesses ranging from about 0.25 inches (6.4 mm) to about 2.0 inches (50.8 mm). In this embodiment, a calibration block having a vertical height of about 1.0 inch (25.4 mm) can be used.

In other embodiments, the location of the coolest internal temperature of the food product can be above or below the geometric center of the food product, which can depend upon factors that can include the location of the most intense heating of the food product. For example, if the food product is heated by devices such as hot plates positioned below the food product, the coolest internal temperature of the food product can be above the geometric center of the food product. As another example, if the food product is cooked in a convection oven, the hottest air in the oven may flow over the top of the food product, and a belt, such as a mesh belt, which supports the food product may inhibit heating the bottom of the food product, such that the coolest internal temperature of the cooked food product can be below the geometric center of the food product.

As subsequently described, when the device 10 is used to measure the temperature of a cooked food product, the upper surface 50 of the lower platen 14 and the lower surface 102 of the upper platen 98 can be in contact with the food product, as shown in FIG. 6 with respect to the food product 15. The location of the longitudinal centerline axis 87 of the coupling member 86 and the location of the longitudinal centerline axis 114 of the coupling member 112, relative to the pivot axis 70, can be selected to achieve a desired vertical movement of the sensor guide structure 80 relative to the upper platen 98, as the lever 66 pivots about the pivot axis 70. For example, if it is desired to position the centerline axis 83 of the aperture 82 midway between the upper surface 50 of the lower platen 14 and the lower surface 102 of the upper platen 98, over a range of thicknesses of food products, coupling members 86 and 112 can be positioned such that the distance $d_2$ between the longitudinal centerline axis 114 of coupling member 112 and the pivot axis 70 is twice as large as the distance $d_1$ between the longitudinal centerline axis 87 of coupling member 86 and the pivot axis 70, i.e., such that distance $d_2$ divided by distance $d_1$ equals 2.0. This ratio of the distance $d_2$ to the distance $d_1$ can result in the upper platen 98 moving twice as far vertically as the sensor guide structure 80, as the lever 66 rotates about the pivot axis 70.

As a result, and in combination with the calibration position of the centerline axis 83, the centerline axis 83 and the temperature sensor 11 extending through the aperture 82 can be positioned midway, or in close proximity to midway, between the upper surface 50 of the lower platen 14 and the lower surface 102 of the upper platen 98, throughout a range of thicknesses of food products having internal temperature measured in other embodiments, different ratios between the distance $d_2$ and the distance $d_1$ can be established as desired, to produce different positions of the centerline axis 83 relative to the upper surface 50 of the lower platen 14 and the lower surface 102 of the upper platen 98, over a range of thicknesses of food products having internal temperature measured. For example, if the coupling member 86 and the coupling member 112 are positioned relative to the pivot 68 such that the ratio of the distance $d_2$ to distance $d_1$ equals 3.0, the upper platen 98 can move vertically by a distance that is three times as large as the vertical distance that the sensor guide structure 80 moves, as the lever 66 pivots about the pivot axis 70. Depending upon the calibration position of the centerline axis 83, this ratio can result in the centerline axis 83, and the temperature sensor 11 that extends through the aperture 82, being positioned below the lower surface 102 of the upper platen 98 by a distance that is one third of the vertical distance between the lower surface 102 of the upper platen 98 and the upper surface 50 of the lower platen 14, when the lower surface 102 of the upper platen 98 contacts a food product positioned on the upper surface 50 of the lower platen 14, throughout a range of thicknesses of food products having internal temperature measured. In one embodiment, the ratio of the distance $d_2$ to the distance $d_1$ can range from about 1.25 to about 4.0. The ratio of the distance $d_2$ to the distance $d_1$ can be selected based upon the expected vertical location of the coolest internal temperature of the food product after completion of the cooking process.

The lever 66 can define a plurality of apertures (e.g., 67 in FIG. 2), which can have various sizes and shapes, and which can result in weight and cost reductions. In one embodiment, each aperture 67 can have an elongated shape, as shown in FIGS. 1-4. The apertures 67 can facilitate adjusting the ratio of the distance $d_2$ to the distance $d_1$, for example by repositioning the coupling member 112 within one of the apertures 67 to achieve a desired ratio. In other embodiments, the lever 66 can define a plurality of clearance holes, with each of the clearance holes sized and configured to receive coupling member 112, to facilitate adjusting the ratio of the distance $d_2$ to the distance $d_1$.

In other embodiments, devices for positioning a temperature sensor can include a sensor guide structure that can be vertically movable in proportion to a thickness of a food product supported on a lower platen of the device, but the devices might have a different configuration. For example, in one embodiment, a device can include a fixed frame and a lower platen that can be supported by a lower portion of the fixed frame, and that can include an upper surface configured to support a food product. The device can also include first and second upright shafts that can be coupled with the fixed frame for vertical movement relative to the fixed frame. A first gear rack can be attached to the first upright shaft and a second gear rack can be attached to the second upright shaft. An upper platen and an associated support structure can be coupled with the first upright shaft for vertical movement with the first upright shaft, and a sensor guide structure, which can define an aperture configured to receive a temperature sensor, can be coupled with the second upright shaft for vertical movement with the second upright shaft. The device can also include a pair of gears, or a pair of gear segments, which can be used to drive, or move, the first and second upright shafts as a result of engagement with the respective gear rack. In one embodiment, the device can include a pair of gear segments that can be rotatable with a common shaft, which can be coupled with the fixed frame, and can be pinned to one another, to ensure rotation through a common angle. The gear segments can have a desired pitch diameter, e.g., 2.0. An operator of the device can position the first upright shaft vertically as desired, for example until a lower surface of the upper platen gently contacts a food product positioned on an upper surface of the lower platen. As a result of this positioning of the first upright shaft and the pitch diameter ratio of the gear segments, the sensor guide structure can be moved vertically relative to the upper surface of the lower platen, in proportion to a thickness of a food product positioned on the upper surface of the lower platen, and the aperture defined by the sensor guide structure can be positioned vertically as desired.

Referring again to the device 10 of FIG. 1, when an operator within a food processing plant desires to measure a temperature of a cooked food product, for example a hamburger or chicken patty, the operator can position the food product receptacle 130 on the lower platen 14 of device 10, for example as described previously. This can be done with the lever 66 in a raised position, for example as shown in FIG. 1, to facilitate access to the lower platen 14. The operator can then place the food product on the upper surface 50 of the lower platen 14, within the interior aperture 138 defined by the food product receptacle 130, as shown in FIG. 6 with respect to food product 15. As shown in FIG. 6, the food product receptacle 130 can have a thickness that is less than the thickness $t_1$ of the food product 15, such that the food product 15 extends above the food product receptacle 130. Food product receptacles can be provided with different thicknesses, for use with food products having varying thicknesses, such that each of the food products can extend vertically above the food product receptacle within which they are placed. This may result in an operator of a food processing plant having an inventory that includes a plurality of food product receptacles, having different thicknesses, for use in measuring the temperature of food products having different thicknesses.

After placing the food product 15 on the upper surface 50 of the lower platen 14, the lever 66 can be pivoted about the pivot axis 70, for example in a counterclockwise direction as viewed in FIGS. 4 and 6, until the lower surface 102 of the upper platen 98 gently contacts the food product 15. In one embodiment, the upper platen support structure 100 and the upper platen 98 can pivot about the longitudinal centerline axis 114 of the coupling member 112. This can result in uniform, or substantially uniform, contact between the lower surface 102 of the upper platen 98 and the food product 15, even in the event that some surface irregularity exists in the food product 15. In other embodiments, the upper platen support structure 100 and the upper platen 98 may not be pivotable relative to the lever 66, depending upon the particular manner in which the upper platen support structure 100 is coupled with the lever 66. Such arrangements can be used, for example, when relatively small angular rotations of the lever 66 are required to position the lower surface 102 of the upper platen 98 in contact with a particular food product.

When the lower surface 102 of the upper platen 98 contacts the food product 15, the sensor guide structure 80 can be positioned vertically such that the centerline axis 83 of the aperture 82 defined by the sensor guide structure 80 is spaced above the upper surface 50 of the lower platen 14 by a distance $d_3$ (FIG. 4). It will be appreciated that the distance $d_3$ can be established as a result of the original calibration of device 10, the thickness $t_1$ of the food product 15, and the ratio of distance $d_2$ to distance $d_1$. The passage 140 of the food product receptacle 130 can be aligned, vertically and laterally, with the centerline axis 83 of the aperture 82 defined by the sensor guide structure 80, when the sensor guide structure 80 and the food product receptacle 130 are positioned relative to one another as shown in FIG. 6. As a result, a temperature sensor extending through the aperture 82, e.g., temperature sensor 11, can also be aligned with the passage 140 defined by the food product receptacle 130.

The temperature sensor 11 can include a tip 17, and can be electrically coupled with a temperature readout device 160, for example with an electrical wire 162. The temperature readout device 160 can include a housing 164 and a temperature display 166, which can be a digital temperature display. The temperature sensor 11 can be moved in a horizontal direction, indicated generally by arrow 168 in FIG. 6, such that the temperature sensor 11 is inserted through the aperture 82 and through a perimeter surface 170 of the food product 15. An operator can continue to insert the temperature sensor 11 horizontally into the food product 15 until the tip 17 of the temperature sensor 11 is positioned at, or in close proximity to, a predetermined location within the food product 15, e.g., a geometric center of the food product 15. The most distal point of the tip 17 can extend slightly beyond the predetermined location within the food product 15 such that a sensing point within the tip 17, which can be proximal of the most distal point of tip 17, is located at, or in close proximity to, a predetermined location within the food product 15, e.g., the geometric center of the food product 15. A collar 172, or other stop member, can be secured to the temperature sensor 11 to control a distance that temperature sensor 11 is inserted horizontally into the food product 15. For example, a distance between a distal surface of the collar 172 and the most distal point of the tip 17 of the temperature sensor 11 can be selected such that the tip 17 is located as desired when the distal surface of the collar 172 contacts a surface 174 of the sensor guide structure 80 as shown in FIG. 6. Accordingly, an operator can move the temperature sensor 11 in the horizontal direction 168 until the distal surface of the collar 172 contacts the surface 174 of the sensor guide structure 82, and can then read a peak temperature of the food product 15, as indicated on the temperature display 166 of the temperature readout device 160.

Use of the device 10 to position a temperature sensor for the purpose of measuring internal temperatures of food products, for example samples of cooked food products within a food processing plant, can result in various advantages. For example, use of the device 10 can result in a more accurate measurement of an internal temperature of a food product at a predetermined location, such as a geometric center of the food product, as compared to known methods wherein a temperature sensor is inserted manually into a food product, through an upper surface, in an uncontrolled manner. The accuracy achieved by device 10 can result, at least in part, from positioning a sensor guide structure (e.g., 80), which receives a temperature sensor (e.g., 11), vertically in proportion to a thickness of a food product positioned on an upper surface of a lower platen (e.g., surface 50 of lower platen 14), and controlling a distance that the temperature sensor is inserted horizontally into the food product. In embodiments where the device 10 includes a food product receptacle (e.g., 130) that defines an interior aperture (e.g., 138), which can receive a food product, the accuracy that can be achieved by device 10 can be further enhanced as a result of positioning the food product receptacle on the upper surface of the lower platen, within a horizontal plane, using mating locating features defined by, or integral with, the lower platen and the food product receptacle.

Use of device 10 can also enhance the repeatability and consistency of measuring the internal peak temperatures of multiple food product samples, at the desired locations within the food product samples. The randomness of observed temperatures of multiple food product samples that can occur using conventional methods, can result in a food processing plant overcooking the food product to ensure a safe food product. Such overcooking can reduce both the quality and weight of the cooked food product, which can result in a loss of income since the sale price of the food product can be a function of both quality and weight. Accordingly, use of device 10, can result in increased income.

Inserting a temperature sensor horizontally through a perimeter surface of a food product, using device 10, can result in an increased immersion depth of the temperature sensor, as compared to the immersion depth of a temperature sensor inserted into the same food product through an upper surface of the food product. Accordingly, use of device 10 can reduce the effect of ambient temperature on the temperature measured by the temperature sensor. Consequently, heat loss from the temperature sensor as a result of a lower ambient temperature, can be reduced. This can be particularly advantageous when measuring the temperature of relatively thin food products, such as relatively thin food patties.

While various embodiments of a device for positioning a temperature sensor, and a method of measuring a temperature of a food product, have been illustrated by the foregoing description and have been described in considerable detail, it is not intended to restrict or in any way limit the scope of the appended claims to such detail. Additional modifications will be readily apparent to those skilled in the art.

What is claimed is:

1. A device for positioning a temperature sensor, the device comprising:
   a support structure;
   a lower platen comprising an upper surface, at least a portion of the upper surface being located in a first horizontal plane, the lower platen being supported by the support structure;

a sensor guide structure defining an aperture configured to receive a temperature sensor, the aperture having a centerline axis parallel with the first horizontal plane; and means for moving the sensor guide structure vertically relative to the upper surface of the lower platen in proportion to a thickness of a food product supported on the upper surface of the lower platen;

wherein the means for moving the sensor guide structure comprises:

an upright member comprising a lower end and an upper end, the lower end being pivotally coupled with the support structure;

a lever; and a first pivot having a first pivot axis and coupling the lever with the upper end of the upright member such that the lever is pivotable about the first pivot axis.

2. The device of claim 1, further comprising:

a biasing member coupled with the lever; wherein the biasing member biases the lever toward a raised position to facilitate placing a food product on, and removing a food product from, the lower platen.

3. The device of claim 1, wherein the means for moving the sensor guide structure further comprises a guide support structure, wherein the guide support structure and the sensor guide structure are manufactured as a unitary structure.

4. The device of claim 1, further comprising:

a food product receptacle supported by the lower platen and comprising an upper surface, a lower surface and an edge surface extending between the lower surface and the upper surface; and means for positioning the food product receptacle on the upper surface of the lower platen within the first horizontal plane; wherein the food product receptacle defines an interior aperture extending through the food product receptacle from the upper surface to the lower surface;

the food product receptacle further defines a passage configured to receive a temperature sensor;

the passage defined by the food product receptacle communicates with the interior aperture and extends through the edge surface; and the passage defined by the food product receptacle is aligned with the aperture defined by the sensor guide structure when the lever is in a lowered, horizontal position.

5. The device of claim 4, wherein:

the means for positioning the food product receptacle comprises a plurality of locating pins integral with one of the lower platen and the food product receptacle, and a plurality of locating apertures defined by the other one of the lower platen and the food product receptacle, each of the locating apertures receiving a respective one of the locating pins.

6. The device of claim 4, wherein:

each of the lower platen and the food product receptacle comprises a food-contact-compatible material.

7. The device of claim 1, wherein the means for moving the sensor guide structure further comprises:

a guide support structure attached to the sensor guide structure and vertically movable with the sensor guide structure;

a first coupling member coupling the guide support structure with the lever, the first coupling member having a first longitudinal centerline axis spaced from the first pivot axis by a first distance;

an upper platen comprising an upper surface and a lower surface, the lower surface facing the upper surface of the lower platen, at least when the lever is in a lowered, horizontal position; and an upper platen support structure attached to the upper platen and coupled with the lever;

a second coupling member coupling the upper platen support structure with the lever, the second coupling member having a second longitudinal centerline axis spaced from the first pivot axis by a second distance; wherein the second distance is greater than the first distance.

8. The device of claim 7, wherein:

the upper platen support structure is pivotable about the second longitudinal centerline axis of the second coupling member.

9. The device of claim 7, wherein:

a predetermined ratio of the second distance to the first distance ranges from about 1.25 to about 4.0.

10. The device of claim 7, wherein the means for moving the sensor guide structure further comprises:

a piston; wherein the piston is attached to one of the support structure and the guide support structure and is vertically movable relative to, and within a bore defined by, the other one of the support structure and the guide support structure, as the lever pivots about the first pivot axis.

11. The device of claim 7, wherein:

the support structure comprises a frame and a lower support plate attached to the frame;

the lower platen is attached to the lower support plate;

the upper platen support structure comprises an upper support plate and a transverse member, the transverse member being integral with, and extending transversely to, the upper support plate;

the upper support plate is attached to the upper platen and is in contact with the upper surface of the upper platen; and the transverse member is coupled with the lever such that the upper platen support structure is pivotable about the second longitudinal centerline axis of the second coupling member.

12. The device of claim 7, wherein the guide support structure and the sensor guide structure are manufactured as a unitary structure.

13. A device for positioning a temperature sensor, the device comprising:

a support structure;

a lower platen comprising an upper surface, at least a portion of the upper surface being located in a first horizontal plane, the lower platen being supported by the support structure;

a sensor guide structure defining an aperture configured to receive a temperature sensor;

an upright member comprising a lower end and an upper end, the lower end being pivotally coupled with the support structure; and a lever pivotally coupled with the upper end of the upright member; and a guide support structure attached to the sensor guide structure and coupled with the lever; wherein the sensor guide structure is vertically movable relative to the upper surface of the lower platen, as the lever pivots relative to the upright member, in proportion to a thickness of a food product supported on the upper surface of the lower platen 14. The device of claim 13, wherein:
the support structure and the lower platen are manufactured as a unitary structure.

15. The device of claim 13, wherein the guide support structure and the sensor guide structure are manufactured as a unitary structure.

16. The device of claim 13, further comprising:
a piston attached to one of the support structure and the guide support structure and vertically movable relative to, and within a bore defined by, the other one of the support structure and the guide support structure; wherein
the aperture defined by the sensor guide structure has a centerline axis, the centerline axis being parallel with the first horizontal plane.

17. The device of claim 16, further comprising:
an upper platen comprising an upper surface and a lower surface, the lower surface of the upper platen facing the upper surface of the lower platen, at least when the lever is in a lowered, horizontal position; and
an upper platen support structure attached to the upper platen and coupled with the lever.

18. The device of claim 17, further comprising:
a first pivot having a first pivot axis and coupling the lever with the upper end of the upright member such that the lever is pivotable about the first pivot axis;
a first coupling member coupling the guide support structure with the lever, the first coupling member comprising a first longitudinal centerline axis spaced from the first pivot axis by a first distance; and
a second coupling member coupling the upper platen support structure with the lever, the second coupling member comprising a second longitudinal centerline axis spaced from the first pivot axis by a second distance; wherein
the second distance is greater than the first distance.

19. The device of claim 18, wherein:
the upper platen support structure is pivotable about the second longitudinal centerline axis of the second coupling member.

20. A method of measuring a temperature of a food product using a device, the device comprising a support structure, a lower platen supported by the support structure, a food product receptacle, and a sensor guide structure defining an aperture having a centerline axis, wherein the food product receptacle comprises an upper surface and a lower surface, the food product receptacle defines an interior aperture, the interior aperture extends through the food product receptacle from the upper surface to the lower surface, and the food product receptacle further comprises an edge surface and further defines a passage communicating with the interior aperture and extending through the edge surface, the method comprising:
positioning the food product receptacle on an upper surface of the lower platen;
placing a food product on the upper surface of the lower platen, the food product having a thickness measured in a first direction perpendicular to the upper surface of the lower platen, the placing the food product comprising placing the food product within the interior aperture defined by the food product receptacle such that the food product contacts the upper surface of the lower platen and extends above the upper surface of the food product receptacle;
positioning the sensor guide structure vertically such that the centerline axis of the aperture defined by the sensor guide structure is spaced above the upper surface of the lower platen by a first distance, the first distance being established in proportion to the thickness of the food product;
inserting a temperature sensor through the aperture defined by the sensor guide structure and into the food product, in a second direction parallel to the upper surface of the lower platen; and
aligning the passage defined by the food product receptacle with the centerline axis of the aperture defined by the sensor guide structure.

21. The method of claim 20, wherein the device further comprises an upright member, a lever, and an upper platen, the upright member comprising a lower end and an upper end, the lower end of the upright member being pivotally coupled with the support structure, the lever being pivotally coupled with the upper end of the upright member and pivotable about a first pivot axis, wherein:
the positioning the sensor guide structure comprises pivoting the lever downwardly, about the first pivot axis, until a lower surface of the upper platen contacts the food product.

22. A method of measuring a temperature of a food product using a device comprising a support structure, a lower platen supported by the support structure, and a sensor guide structure defining an aperture having a centerline axis, the method comprising:
placing a food product on an upper surface of the lower platen, the food product having a thickness measured in a first direction perpendicular to the upper surface of the lower platen;
positioning the sensor guide structure vertically such that the centerline axis of the aperture defined by the sensor guide structure is spaced above the upper surface of the lower platen by a first distance, the first distance being established in proportion to the thickness of the food product; and
inserting a temperature sensor through the aperture defined by the sensor guide structure and into the food product, in a second direction parallel to the upper surface of the lower platen;
wherein the inserting the temperature sensor comprises inserting the temperature sensor horizontally through the aperture defined by the sensor guide structure and through a perimeter surface of the food product until a stop secured to the temperature sensor contacts the sensor guide structure.

23. The method of claim 22, further comprising:
electrically coupling the temperature sensor to a temperature readout device comprising a temperature display; and
after the inserting the temperature sensor, reading a peak temperature of the food product, as indicated on the temperature display of the temperature readout device.

* * * * *